United States Patent
Chen et al.

(10) Patent No.: US 9,342,164 B2
(45) Date of Patent: May 17, 2016

(54) MOTION DETECTING DEVICE AND THE METHOD FOR DYNAMICALLY ADJUSTING IMAGE SENSING AREA THEREOF

(71) Applicant: PIXART IMAGING INC., Hsin-Chu (TW)

(72) Inventors: Chun-Wei Chen, Hsin-Chu (TW); Ren-Hau Gu, Hsin-Chu (TW); Shih-Wei Kuo, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 228 days.

(21) Appl. No.: 14/057,081

(22) Filed: Oct. 18, 2013

(65) Prior Publication Data

US 2014/0313132 A1  Oct. 23, 2014

(30) Foreign Application Priority Data

Apr. 19, 2013 (TW) .............................. 102113943 A

(51) Int. Cl.
| | |
|---|---|
| *G06F 3/033* | (2013.01) |
| *G06F 3/038* | (2013.01) |
| *G06F 3/0354* | (2013.01) |
| *G06F 3/03* | (2006.01) |

(52) U.S. Cl.
CPC .............. *G06F 3/038* (2013.01); *G06F 3/0317* (2013.01); *G06F 3/03543* (2013.01)

(58) Field of Classification Search
CPC ... G06F 3/3543; G06F 3/0354; G06F 3/0317; G06F 3/038; G06F 3/0304; G06F 3/033; G06F 3/042
See application file for complete search history.

(56) References Cited

U.S. PATENT DOCUMENTS

| | | | | |
|---|---|---|---|---|
| 7,116,427 | B2* | 10/2006 | Baney et al. ................... | 356/498 |
| 7,161,682 | B2* | 1/2007 | Xie et al. ........................ | 356/520 |
| 7,256,387 | B2* | 8/2007 | Kwak ............................ | 250/221 |
| 7,321,359 | B2* | 1/2008 | Xie et al. ........................ | 345/163 |
| 7,525,082 | B2* | 4/2009 | Itagaki ........................... | 250/221 |
| 7,567,341 | B2* | 7/2009 | Dolfi ..................... G06F 3/03543 356/28 |
| 7,872,639 | B2* | 1/2011 | Theytaz et al. ................ | 345/166 |
| 7,898,524 | B2* | 3/2011 | Theytaz et al. ................ | 345/166 |
| 8,525,777 | B2* | 9/2013 | Stavely et al. ................. | 345/156 |
| 2005/0024336 | A1* | 2/2005 | Xie et al. ........................ | 345/166 |
| 2005/0024623 | A1* | 2/2005 | Xie et al. ....................... | 356/3.01 |
| 2005/0094154 | A1* | 5/2005 | Baney et al. ................... | 356/499 |
| 2006/0125794 | A1* | 6/2006 | Afriat ............................ | 345/166 |
| 2006/0262094 | A1* | 11/2006 | Chang ........................... | 345/166 |

(Continued)

*Primary Examiner* — Lun-Yi Lao
*Assistant Examiner* — Peter D McLoone
(74) *Attorney, Agent, or Firm* — Li & Cai Intellectual Property (USA) Office

(57) ABSTRACT

A motion detecting device and the method for dynamically adjusting image sensing area is disclosed. The motion detecting device includes a light source, an image capture unit and a processing unit. The image capture unit is used to capture reference image according to fixed sampling period. The processing unit is used to calculate exposure reference value of the light source and image characteristic value of reference image. The processing unit according to the exposure reference value and the image characteristic value to determine whether the surface is in first rough coefficient range or second rough coefficient range. If rough coefficient of the surface is in the first rough coefficient range, the processing unit defines first search radius or second search radius to increase or decrease the image sensing area. Otherwise, the processing unit defines third search radius or fourth search radius to increase or decrease the image sensing area.

19 Claims, 12 Drawing Sheets

(56) References Cited

U.S. PATENT DOCUMENTS

| | | | |
|---|---|---|---|
| 2007/0008286 A1* | 1/2007 | Theytaz et al. | 345/166 |
| 2007/0013661 A1* | 1/2007 | Theytaz et al. | 345/166 |
| 2007/0247426 A1* | 10/2007 | Vorst | 345/163 |
| 2008/0158540 A1* | 7/2008 | Dolfi | G06F 3/03543 356/28 |
| 2009/0026351 A1* | 1/2009 | Itagaki | 250/206.1 |
| 2009/0135140 A1* | 5/2009 | Constantin et al. | 345/166 |
| 2009/0225207 A1* | 9/2009 | Jung et al. | 348/296 |
| 2011/0050573 A1* | 3/2011 | Stavely et al. | 345/166 |
| 2012/0068927 A1* | 3/2012 | Poston et al. | 345/163 |
| 2014/0028561 A1* | 1/2014 | Wang et al. | 345/166 |
| 2014/0145957 A1* | 5/2014 | Chen et al. | 345/166 |
| 2014/0160024 A1* | 6/2014 | Huang et al. | 345/166 |
| 2014/0191971 A1* | 7/2014 | Chen et al. | 345/166 |
| 2014/0210722 A1* | 7/2014 | Chen et al. | 345/166 |
| 2014/0292657 A1* | 10/2014 | Chen et al. | 345/166 |
| 2014/0333540 A1* | 11/2014 | Wang et al. | 345/166 |
| 2014/0368433 A1* | 12/2014 | Chen et al. | 345/166 |
| 2015/0097779 A1* | 4/2015 | Wang et al. | 345/166 |

\* cited by examiner

MOTION DETECTING DEVICE AND THE METHOD FOR DYNAMICALLY ADJUSTING IMAGE SENSING AREA THEREOF

BACKGROUND OF THE INVENTION

1. Field of the Invention

The instant disclosure relates to a motion detecting device; in particular, to motion detecting device for dynamically adjusting an image sensing region.

2. Description of Related Art

With rapid development of the technology, it brings the wide application of the computer. A mouse serves as an input tool of a computer, which greatly facilitate the operation of the computer in people. In operation, when the mouse is placed on a mounted platform, it can control cursor pointer of computer by moving the mouse on the mounted platform. With the continuous upgrading of electronic products, demands for electronic products have become increasingly high by the consumer. To enhance the convenience of use for computer equipment, a traditional wired mouse has gradually replaced by a wireless optical mouse. The wireless optical mouse typically includes a light source, a digital signal processor, an image sensor and a wireless transmission unit (i.e. energy-consuming elements), its overall energy consumption is large and the wireless optical mouse is with the problem of insufficient battery life.

The optical mouse in prior art utilizes the image sensor to capture reference images consecutively, and then compares a reference frame captured by the image sensor with a current frame in a sampling period so as to determine an amount of the displacement. After determining the amount of the displacement, the current frame is updated as the reference frame and then the optical mouse in prior art compares the reference frame updated with the current frame newly captured so as to acquire another amount of the displacement in the next sampling period. However, the method for detecting displacement exist a problem of insufficient accuracy. Accordingly, a user is not able to make movement of the cursor move with higher speed. Moreover, the optical mouse includes the light source, the digital signal processor, the image sensor and the wireless transmission unit (i.e. energy-consuming elements), so total energy consumption for the image sensor is large.

SUMMARY OF THE INVENTION

The instant disclosure provides a motion detecting device, is configured for detecting a flatness of a surface and dynamically adjusting an image sensing region, the motion detecting device comprises a light source, an image capture unit and a processing unit. The light source is configured for launching a light. The image capture unit is configured for capturing at least one reference image of the surface according to a fixed sampling period. The processing unit, connected to the light source and the image capture unit, is configured for calculating an exposure reference value of the light source and an image characteristic value of the reference image, and then accordingly determining whether the surface is in a first rough coefficient range or a second rough coefficient range, wherein the processing unit chooses a search frame which is smaller than the reference image on the reference image. If the surface is in the first rough coefficient range, the processing unit defines a first search radius on the reference image so as to increase the image sensing region or defines a second search radius on the reference image to decrease the image sensing region, and the first search radius is larger than the second search radius. If the surface is in the second rough coefficient range, the processing unit defines a third search radius on the reference so as to increase the image sensing region or defines a fourth search radius on the reference image to decrease the image sensing region, and the third search radius is larger than the first search radius and the fourth search radius.

In an embodiment of the instant disclosure, the motion detecting device further comprise a memory unit, a transmission interface unit, a first lens and a second lens. The memory unit is connected to the processing unit, and the memory unit is configured for storing at least one threshold value. The transmission interface unit is connected to the processing unit, and the transmission interface unit is configured for transmitting motion information to an image display device so as to control correspondingly. The first lens is disposed in the front of the light source, and the first lens is configured for adjusting an illumination range of the light source. The second lens is disposed in the front of the image capture unit, and the second lens is configured for enhancing the efficiency of light-sensitive of the image capture unit. The light source is a light-emitting diode or a laser diode.

In an embodiment of the instant disclosure, the exposure reference value is an exposure time or an amount of the exposure, and the image capture unit adjusts the amount of the exposure of the light source via an aperture.

In an embodiment of the instant disclosure, the processing unit calculates the image characteristic value via an accumulated grayscale difference of the reference image. If the accumulated grayscale difference is larger than an accumulated threshold value, the reference image has a high image characteristic value. If the accumulated grayscale difference is smaller than the accumulated threshold value, the reference image has a low image characteristic value, wherein the accumulated grayscale difference is proportional to the image characteristic value.

In an embodiment of the instant disclosure, if the exposure reference value of the light source is larger than an exposure threshold value, the exposure reference value is a long exposure reference value. If the exposure reference value of the light source is smaller than an exposure threshold value, the exposure reference value is a short exposure reference value.

In an embodiment of the instant disclosure, when the image capture unit is located in a dark field, the processing unit determines the surface is in the first rough coefficient range or the second rough coefficient range via respectively judging the exposure value and the image characteristic value.

In an embodiment of the instant disclosure, when the image capture unit is located in a dark field, the processing unit makes the exposure reference value divided by the image characteristic value so as to acquire an operation value; if the operation value is larger than a predetermined threshold value, the surface is in the first rough coefficient range; if the operation value is smaller than the predetermined threshold value, the surface is in the second rough coefficient range.

In an embodiment of the instant disclosure, when the image capture unit is located in a light field, the processing unit determines the surface is in the first rough coefficient range or the second rough coefficient range via respectively judging the exposure value and the image characteristic value.

In an embodiment of the instant disclosure, the dark field defines that the image capture unit is located at a scattering path of the light source.

In an embodiment of the instant disclosure, the light field defines that the image capture unit is located at a reflection path of the light source.

In an embodiment of the instant disclosure, the surface in the first rough coefficient range is a smooth surface, and the surface in the second rough coefficient range is a sough surface.

The instant disclosure provides a method for dynamically adjusting an image sensing region, and the method includes steps as follows: capturing at least one reference image of a surface according to a fixed sampling period; calculating an exposure reference value of a light source and an image characteristic value of the reference image; determining whether the surface is in a first rough coefficient range or a second rough coefficient range according to at least one threshold value; and adjusting the image sensing region dynamically according to a determination result of whether the surface being in the first rough coefficient range or a second rough coefficient range.

In summary, the motion detecting device and the method for dynamically adjusting an image sensing region provided by the instant disclosure is able to dynamically adjust the image sensing region according to the determination result via detecting flatness of the surface so as to achieve adjustment for tracking speed, or dynamically adjust the image sensing region according to flatness of the surface so as to reduce power consumption.

For further understanding of the instant disclosure, reference is made to the following detailed description illustrating the embodiments and examples of the instant disclosure. The description is only for illustrating the instant disclosure, not for limiting the scope of the claim.

DETAILED DESCRIPTION OF PREFERRED EMBODIMENTS

Figure 1A:
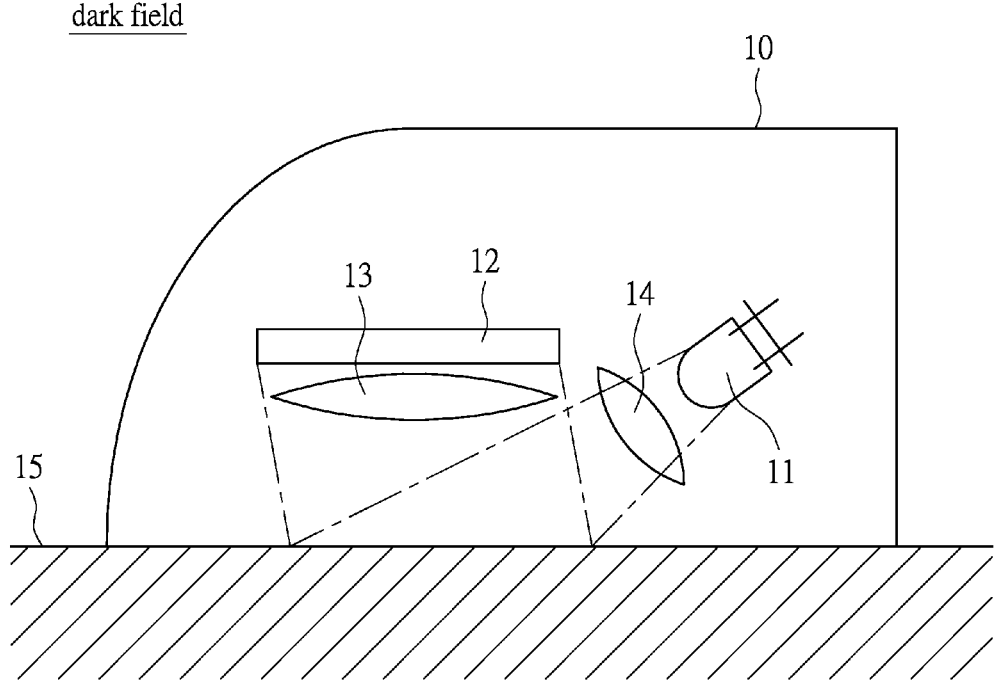
FIG. 1A shows schematic diagram of the motion detecting device for dark field according to one embodiment of the instant disclosure.

The aforementioned illustrations and following detailed descriptions are exemplary for the purpose of further explaining the scope of the instant disclosure. Other objectives and advantages related to the instant disclosure will be illustrated in the subsequent descriptions and appended drawings. In the drawings, the size and relative sizes of layers and regions may be exaggerated for clarity.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the present disclosure. As used herein, the term "and/or" includes any and all combinations of one or more of the associated listed items.

[One Embodiment of the Motion Detecting Device for Dark Field Apparatus]

Figure 1B:
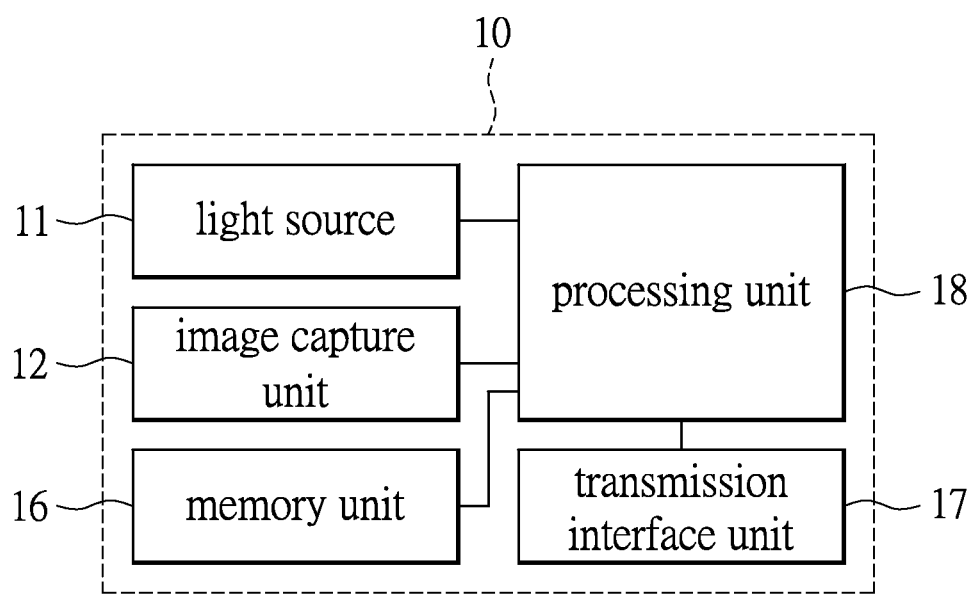
FIG. 1B shows circuit block diagram of the motion detecting device corresponding to FIG. 1A.

Referring to FIGS. 1A and 1B, FIG. 1A shows schematic diagram of the motion detecting device for dark field according to one embodiment of the instant disclosure. FIG. 1B shows circuit block diagram of the motion detecting device corresponding to FIG. 1A. In the present embodiment, the motion detecting device 10 is configured for detecting flatness of a surface 15, and dynamically adjusting an image sensing region according to flatness of a surface 15, wherein the motion detecting device 10 may be an optical mouse or optical navigation device. Generally, the motion detecting device 10 is placed on the surface 15 (e.g. desktop or surface of the mouse pad) for user to control, so as to control cursor movement of the image display device (e.g. screen for displaying image), wherein the image display device may be a computer screen, TV screen, projection screen or game screen. It is worth to be noted that the motion detecting device 10 of instant disclosure takes the optical mouse as an example for instruction, but it is not restricted thereto. As shown in FIGS. 1A and 1B, the motion detecting device 10 includes a light source 11, an image capture unit 12, a processing unit 18, a memory unit 16, a transmission interface unit 17, a first lens 14 and a second lens 13. The light source 11, the image capture unit 12, the memory unit 16 and the transmission interface unit 17 are electrically connected to the processing unit 18 respectively. The first lens is disposed in the front of the light source 11, the second lens 13 is disposed in the front of the image capture unit 12, and the image capture unit 12 is disposed at a scattering path of the light launched from the light source 11. The memory unit 16 may be a Mask ROM, EPROM, EEPROM or flash memory. In the present disclosure, the light source 11 configured for launching a light with an emission cycle may be light-emitting diode (LED) or a laser diode. The image capture unit 12 is configured for capturing at least one reference image of the surface 15 according to a fixed sampling period, and the emission period of the light source 11 is integer multiple of the fixed sampling period, and then the image capture unit 12 can be synchronized to emission of the light source 11, so as to make the image capture unit 12 capture the reference image of the surface 15. The processing unit 18 is configured for calculating an exposure reference value of the light source 11 (e.g. exposure time or amount of the exposure of the light source 11) and an image characteristic value of the reference image, and then accordingly determining whether the surface 15 is in a first rough coefficient range or a second rough coefficient range, wherein the processing unit 18 chooses a search frame which is smaller than the reference image on the reference image. The memory unit 16 is configured for storing at least one threshold value and important coordinate information of each reference image. The transmission interface unit 17 is configured for transmitting motion information to an external processing device (e.g. an image display device) so as to control correspondingly. The first lens 14 is configured for adjusting an illumination range of the light source 11. The second lens 13 is configured for enhancing the efficiency of light-sensitive of the image capture unit 12. If the surface 15 is in the first rough coefficient range, the processing unit 18 defines a first search radius on the reference image so as to increase the image sensing region and then acquire higher speed/acceleration, or defines a second search radius on the reference image to decrease the image sensing region and then reduce power consumption, wherein the first search radius is larger than the second search radius. In addition, if the surface 15 is in the second rough coefficient range, the processing unit 18 defines a third search radius on the reference so as to increase the image sensing region and then acquire higher speed/acceleration, or defines a fourth search radius on the reference image so as to decrease the image sensing region and then reduce power consumption, wherein the third search radius is larger than the first search radius and the fourth search radius. It is worth mentioned that, in the present embodiment, each frame or light image has 16×16 pixel and the search frame is set to 8×8 pixel, the first search radius and the fourth search radius are set to three pixel distance, the third search radius is set to five pixel distance and the second search radius is set to one pixel distance. All the values set herein are merely one embodiment of the instant disclosure, it is not restricted thereto and these values can be determined based on the actual product design.

The following description is further instruction in teaching a work mechanism of the motion detecting device 10. Before further instruction, is it clarified that the motion detecting device 10 has different threshold value and judgment mechanism according to dark field or light field optical apparatus. Additionally, the dark field defines that the image capture unit 12 is located at a scattering path of the light, and the light field defines that the image capture unit 12 is located at a reflection path of the light. In the present disclosure, FIGS. 1A~5 disclose dark field optical apparatus, and FIGS. 6~10B disclose dark field optical apparatus.

Figure 2:
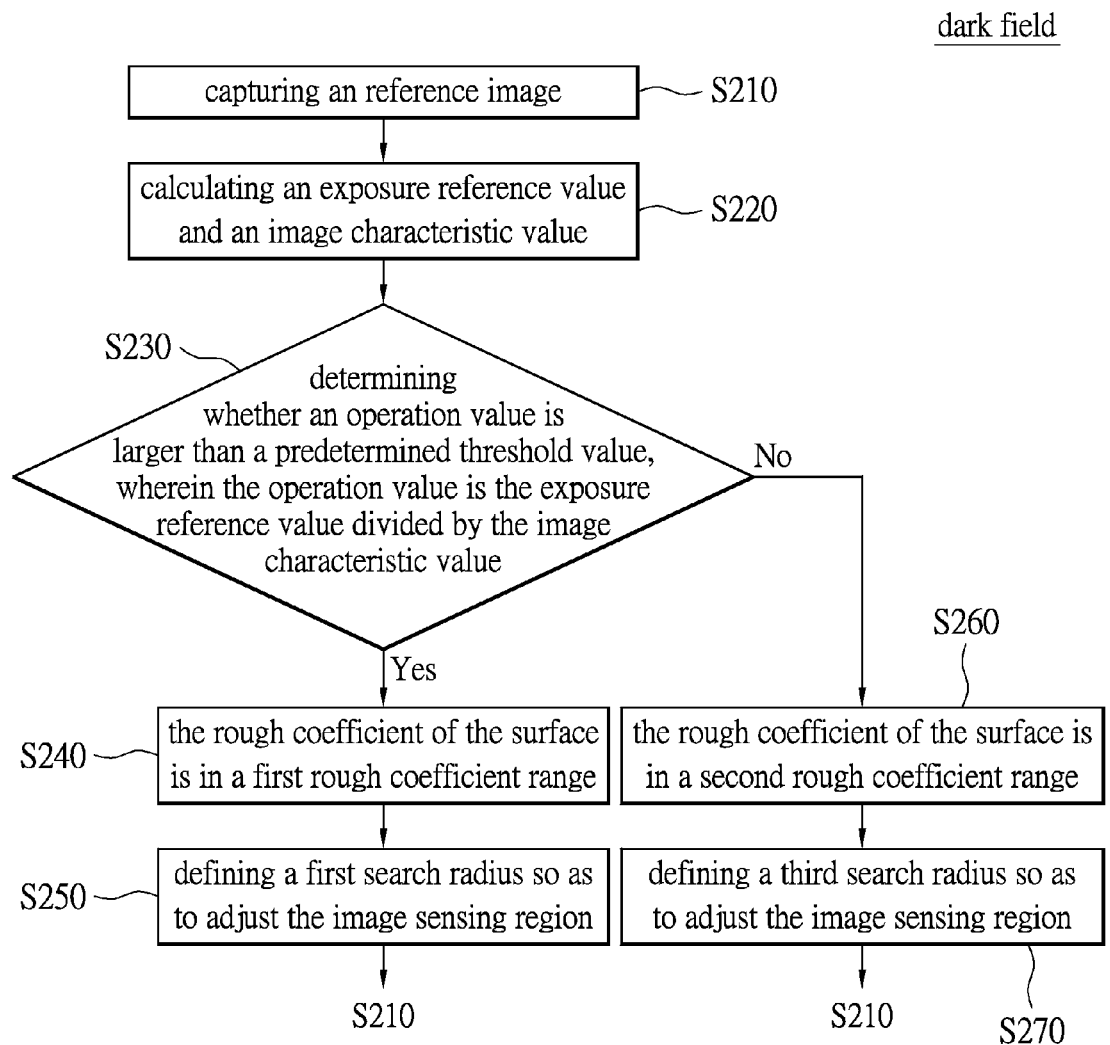
FIG. 2 shows flow diagram of dynamically adjusting the image sensing region in the dark field according to one embodiment of the instant disclosure.
Figure 3A:
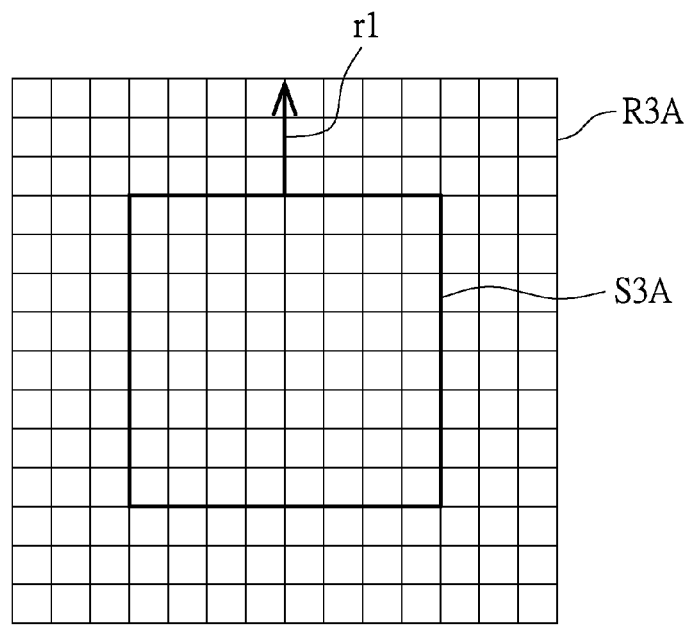
FIGS. 3A and 3B shows schematic diagram of the reference image and the search frame corresponding to FIG. 2.
Figure 3B:
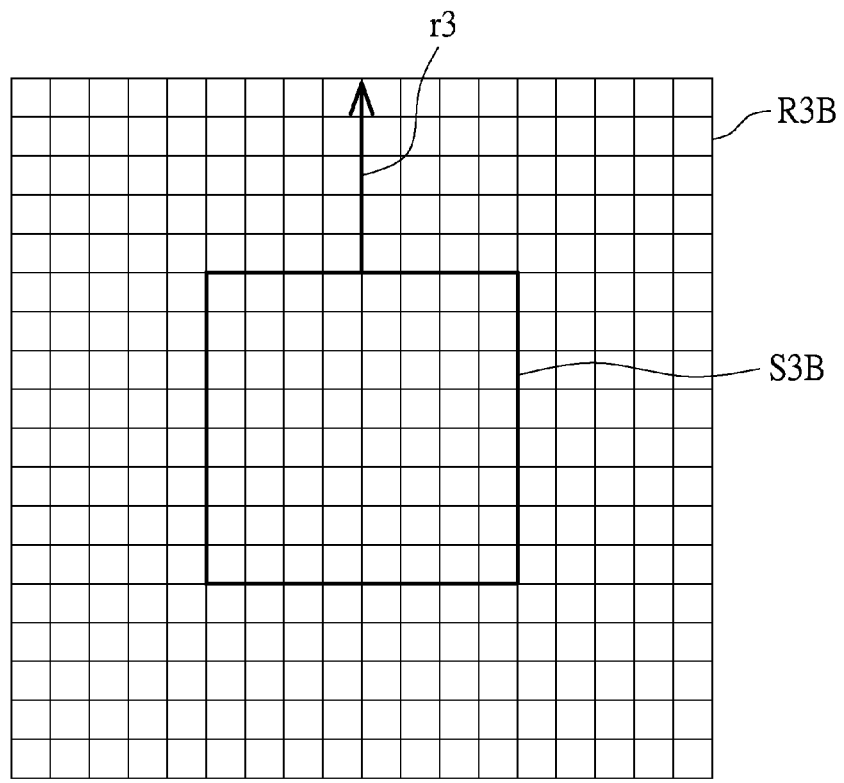

Referring to FIGS. 1A and 3B concurrently, FIG. 2 shows flow diagram of dynamically adjusting the image sensing region in the dark field according to one embodiment of the instant disclosure. FIGS. 3A and 3B shows schematic diagram of the reference image and the search frame corresponding to FIG. 2. It is to be noted that, in the embodiment of FIG. 2, it discloses an exemplary embodiment for detecting flatness of the surface in the dark field apparatus so as to dynamically adjust the image sensing region to acquire higher speed/acceleration. The method for dynamically adjusting an image sensing region includes steps as follows: capturing an reference image (step S210); calculating an exposure reference value and an image characteristic value (step S220); determining whether an operation value is larger than a predetermined threshold value, wherein the operation value is the exposure reference value divided by the image characteristic value (step S230); determining that the rough coefficient of the surface is in a first rough coefficient range (step S240); defining a first search radius so as to adjust the image sensing region (step S250); determining that the rough coefficient of the surface is in a second rough coefficient range (step S260); defining a third search radius so as to adjust the image sensing region (step S270). The following is to sequentially instruct each step for understanding the instant disclosure.

In step S210, when the light source 11 emits a light with an emission cycle to the surface 15, the image capture unit 12 captures an reference image or the optical image of surface 15 with a sampling period synchronized to the emission cycle of the light source 15 and then transmits the reference image to the processing unit 18, and then enters into step S220.

In step S220, the processing unit 18 calculates an exposure time or an amount of exposure of the light source 11 for acquiring an exposure reference value (or determined by amount of current flowing through the LED) at the time of capturing the reference image by the image capture unit 12, and then the processing unit 18 calculates the image characteristic value according to the reference image received, wherein the processing unit 18 may transmit a control signal to the image capture unit 12 for adjusting amount of exposure of the light source 11 via a aperture. Furthermore, the processing unit 18 calculates an accumulated grayscale difference for acquiring the image characteristic value of the reference image via grayscale value of the reference image, wherein the accumulated grayscale difference is proportional to the image characteristic value, and then enters into step S230.

In step S230, the processing unit 18 further makes the exposure reference value be divided by the image characteristic value for acquiring the operation value. Next, the processing unit 18 compares the operation value with the predetermined threshold value stored in the memory unit 19 so as to determine whether the operation value is larger than the predetermined threshold value, wherein the predetermined threshold value is used for determining whether the surface 15 is a smooth surface or a rough surface and the predetermined threshold value is able to be designed by designer according to an actual application demand, wherein its value is not intended to limit the instant disclosure. Herein, if determination result in step S230 is yes, it enters into step S240, if otherwise, it enters into step S260.

In step S240, if the processing unit 18 determines that the operation value (i.e. the exposure reference value is divided by the image characteristic value) is larger than the predetermined threshold value in step S230, the processing unit 18 determines that the rough coefficient of the surface 15 is in the first rough coefficient range, wherein the surface 15 in the first rough coefficient range is the smooth surface. It is worth mentioned that the step S210 to the step S240 are related detecting and judging flow for the motion detecting device 10 determining whether the surface 15 is the smooth surface.

In step S250, the motion detecting device 10 starts to dynamically adjust the image sensing region according to flatness of the surface 15. Referring to FIG. 3A concurrently, when the processing unit 18 in the motion detecting device 10 determines the surface 15 is located at the smooth surface in the first rough coefficient range according to determination result, the processing unit 18 chooses or sets a search frame S3A on the reference image R3A so as to define searching and calculating range for the motion detecting device 10 and outward define a first search radius r1 on the boundary of the search frame S3A. Moreover, scanning range of the first search radius r1 is a reserved region for motion detecting device 10 searching and calculating the reference image R3A, so as to dynamically adjust the image sensing region for acquiring higher speed/acceleration, wherein the search frame S3A has 8×8 pixel (i.e. active sensing region) and the first search radius r1 has 3 pixel distance (i.e. reserved sensing region). It is worth mentioned that the reference image R3A in FIG. 3A is 11×11 pixel, which is smaller than original light image (16×16 pixel). In other words, as long as the motion detecting device 10 searches and calculates the reference image R3A formed by the active sensing region and the reserved sensing region of the original light image. Next, the motion detecting device 10 will back to step S210 to continue detecting flatness of the surface for determining whether to dynamically adjust the image sensing region again.

In step S260, if the processing unit 18 determines that the operation value (i.e. the exposure reference value is divided by the image characteristic value) is smaller than the predetermined threshold value in step S230, the processing unit 18 determines that the rough coefficient of the surface 15 is in the second rough coefficient range, wherein the surface 15 in the second rough coefficient range is the rough surface. It is worth mentioned that the step S210, S220, S230 and S260 are related detecting and judging flow for the motion detecting device 10 determining whether the surface 15 is the rough surface.

In step S270, the motion detecting device 10 starts to dynamically adjust the image sensing region according to flatness of the surface 15. Referring to FIG. 3B concurrently, when the processing unit 18 in the motion detecting device 10 determines the surface 15 is located at the rough surface in the second rough coefficient range according to determination result, the processing unit 18 chooses or sets a search frame S3B on the reference image R3B so as to define searching and calculating range for the motion detecting device 10 and outward define a third search radius r3 on the boundary of the search frame S3B. Moreover, scanning range of the third search radius r3 is a reserved region for motion detecting device 10 searching and calculating the reference image R3B, so as to dynamically adjust the image sensing region for acquiring higher speed/acceleration, wherein the search frame S3B has 8×8 pixel (i.e. active sensing region) and the third search radius r3 has 5 pixel distance (i.e. reserved sensing region). It is worth mentioned that the reference image R3B in FIG. 3B is 13×13 pixel, which is smaller than original light image (16×16 pixel). In other words, as long as the motion detecting device 10 searches and calculates the reference image R3B formed by the active sensing region and the reserved sensing region of the original light image. Next, the motion detecting device 10 will back to step S210 to continue detecting flatness of the surface for determining whether to dynamically adjust the image sensing region again.

Accordingly, under operation of dark field apparatus, the third search radius r3 (five pixel distance) is larger than the first search radius r1 (three pixel distance); which means that the reserved sensing region for searching and calculating on the rough surface is larger than the reserved sensing region on the smooth surface. Therefore, the motion detecting device 10 may properly set search radius for dynamically adjust the image sensing region so as to acquire appropriate speed/acceleration.

[Another Embodiment of the Motion Detecting Device for Dark Field Apparatus]

Figure 4:
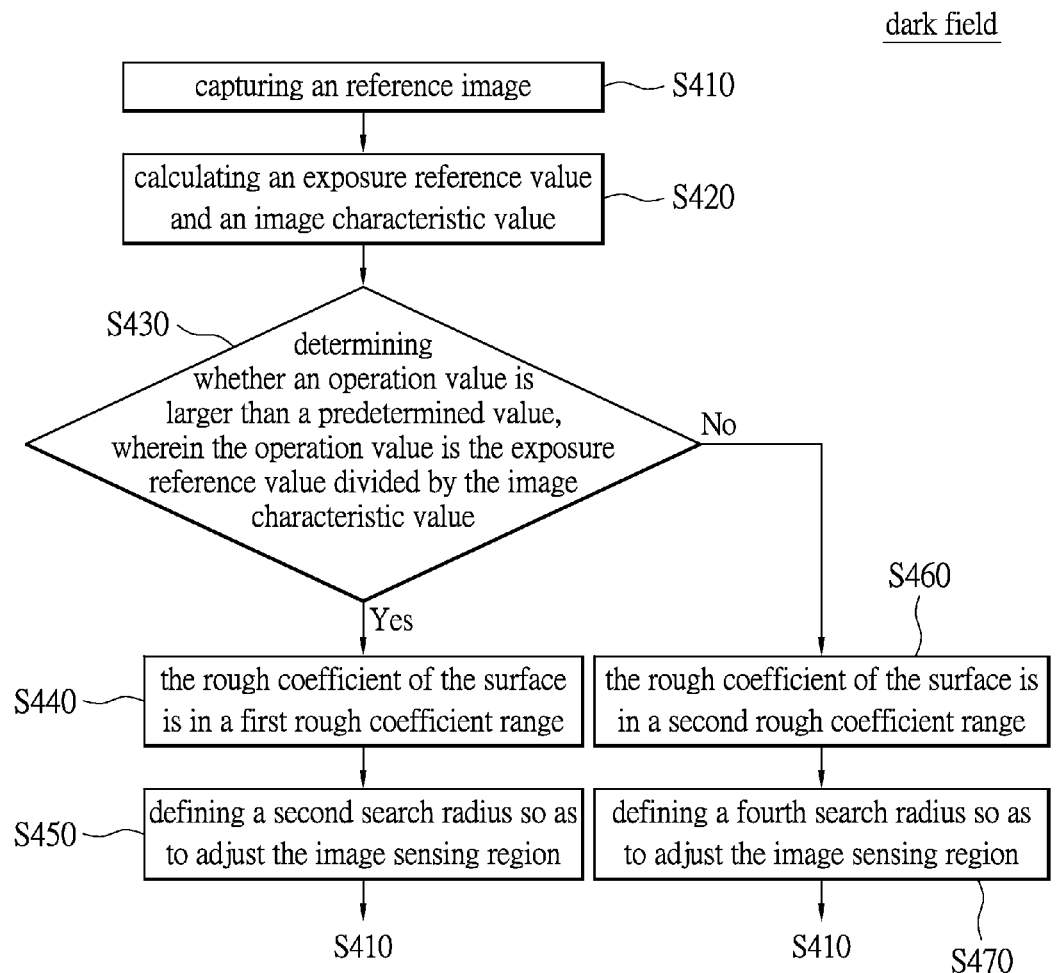
FIG. 4 shows flow diagram of dynamically adjusting the image sensing region in the dark field according to another one embodiment of the instant disclosure.
Figure 5A:
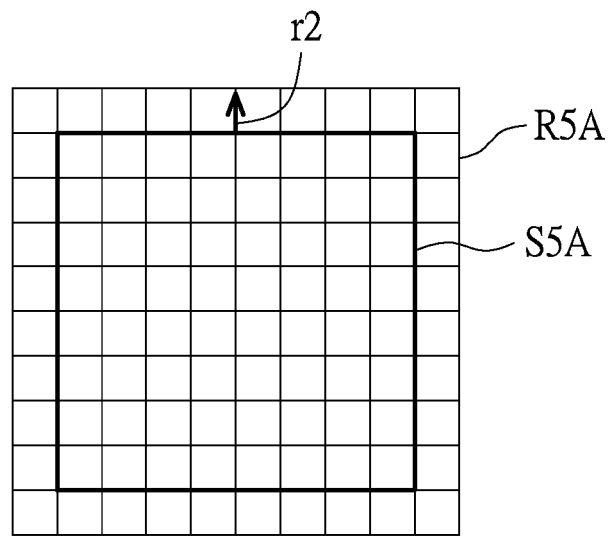
FIGS. 5A and 5B shows schematic diagram of the reference image and the search frame corresponding to FIG. 4.
Figure 5B:
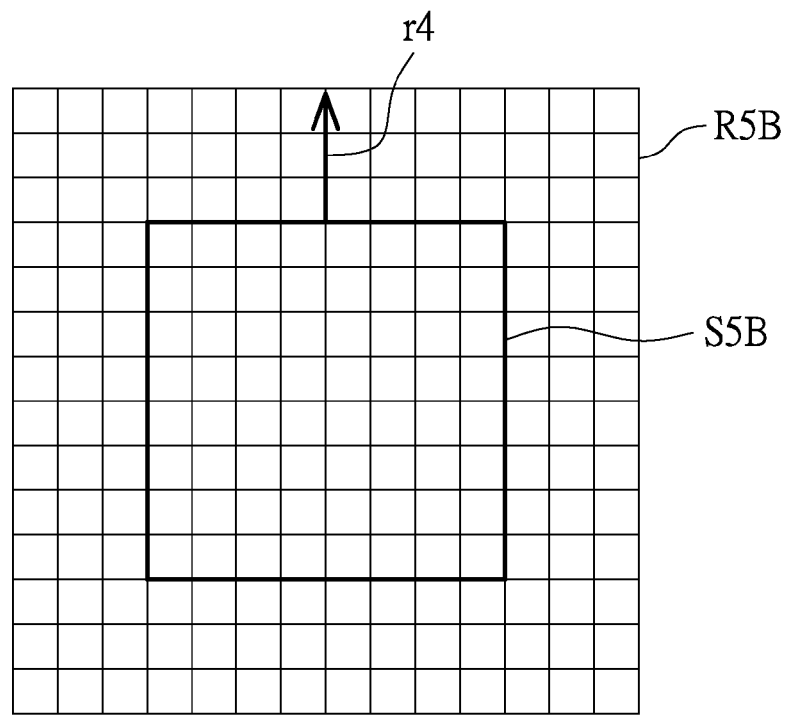

Next, Referring to FIGS. 1A, 1B and 4~5B concurrently, FIG. 4 shows flow diagram of dynamically adjusting the image sensing region in the dark field according to another one embodiment of the instant disclosure. FIGS. 5A and 5B shows schematic diagram of the reference image and the search frame corresponding to FIG. 4. It is to be noted that, in the embodiment of FIG. 4, it discloses an exemplary embodiment for detecting flatness of the surface in the dark field apparatus so as to dynamically adjust the image sensing region to reduce power consumption. Herein, to reduce power consumption is compared to the embodiment of FIGS. 2~3B. The method for dynamically adjusting an image sensing region includes steps as follows: capturing an reference image (step S410); calculating an exposure reference value and an image characteristic value (step S420); determining whether an operation value is larger than a predetermined value, wherein the operation value is the exposure reference value divided by the image characteristic value (step S430); determining that the rough coefficient of the surface is in a first rough coefficient range (step S440); defining a second search radius so as to adjust the image sensing region (step S450); determining that the rough coefficient of the surface is in a second rough coefficient range (step S460); defining a fourth search radius so as to adjust the image sensing region (step S470). The following is to sequentially instruct each step for understanding the instant disclosure.

In step S410, when the light source 11 emits a light with an emission cycle to the surface 15, the image capture unit 12 captures an reference image or the optical image of surface 15 with a sampling period synchronized to the emission cycle of the light source 15 and then transmits the reference image to the processing unit 18, and then enters into step S420.

In step S420, the processing unit 18 calculates an exposure time or an amount of exposure of the light source 11 for acquiring an exposure reference value (or determined by amount of current flowing through the LED) at the time of capturing the reference image by the image capture unit 12, and then the processing unit 18 calculates the image characteristic value according to the reference image received, wherein the processing unit 18 may transmit a control signal to the image capture unit 12 for adjusting amount of exposure of the light source 11 via a aperture. Furthermore, the processing unit 18 calculates an accumulated grayscale difference for acquiring the image characteristic value of the reference image via grayscale value of the reference image, wherein the accumulated grayscale difference is proportional to the image characteristic value, and then enters into step S430.

In step S430, the processing unit 18 further makes the exposure reference value be divided by the image characteristic value for acquiring the operation value. Next, the processing unit 18 compares the operation value with the predetermined threshold value stored in the memory unit 19 so as to determine whether the operation value is larger than the predetermined threshold value, wherein the predetermined threshold value is used for determining whether the surface 15 is a smooth surface or a rough surface and the predetermined threshold value is able to be designed by designer according to an actual application demand, wherein its value is not intended to limit the instant disclosure. Herein, if determination result in step S430 is yes, it enters into step S440, if otherwise, it enters into step S460.

In step S440, if the processing unit 18 determines that the operation value (i.e. the exposure reference value is divided by the image characteristic value) is larger than the predetermined threshold value in step S430, the processing unit 18 determines that the rough coefficient of the surface 15 is in the first rough coefficient range, wherein the surface 15 in the first rough coefficient range is the smooth surface. It is worth mentioned that the step S410 to the step S440 are related detecting and judging flow for the motion detecting device 10 determining whether the surface 15 is the smooth surface.

In step S450, the motion detecting device 10 starts to dynamically adjust the image sensing region according to flatness of the surface 15. Referring to FIG. 5A concurrently, when the processing unit 18 in the motion detecting device 10 determines the surface 15 is located at the smooth surface in the first rough coefficient range according to determination result, the processing unit 18 chooses or sets a search frame S5A on the reference image R5A so as to define searching and calculating range for the motion detecting device 10 and outward define a second search radius r2 on the boundary of the search frame S5A. Moreover, scanning range of the second search radius r2 is a reserved region for motion detecting device 10 searching and calculating the reference image R5A, so as to dynamically adjust the image sensing region for reducing power consumption, wherein the search frame S5A has 8×8 pixel (i.e. active sensing region) and the second search radius r2 has 1 pixel distance (i.e. reserved sensing region), wherein the first search radius r1 is larger than the second search radius r2. It is worth mentioned that the reference image R5A in FIG. 5A is 9×9 pixel, which is smaller than original light image (16×16 pixel). Furthermore, compared to embodiment in FIG. 3A, the motion detecting device 10 in the embodiment of FIG. 5A defines the second search radius r2 to decrease the image sensing region for reducing power consumption; which means, as long as the motion detecting device 10 searches and calculates the reference image R5A formed by the active sensing region and the reserved sensing region of the original light image. In other words, compared to embodiment in FIG. 5A, the reference image R3A in the embodiment of FIG. 3A is 11×11 pixel, the motion detecting device 10 defines the first search radius r1 to increase the image sensing region for acquiring higher speed/acceleration.

In step S460, if the processing unit 18 determines that the operation value (i.e. the exposure reference value is divided by the image characteristic value) is smaller than the predetermined threshold value in step S430, the processing unit 18 determines that the rough coefficient of the surface 15 is in the second rough coefficient range, wherein the surface 15 in the second rough coefficient range is the rough surface. It is worth mentioned that the step S410, S420, S430 and S460 are related detecting and judging flow for the motion detecting device 10 determining whether the surface 15 is the rough surface.

In step S470, the motion detecting device 10 starts to dynamically adjust the image sensing region according to flatness of the surface 15. Referring to FIG. 5B concurrently, when the processing unit 18 in the motion detecting device 10 determines the surface 15 is located at the rough surface in the second rough coefficient range according to determination result, the processing unit 18 chooses or sets a search frame S5B on the reference image R5B so as to define searching and calculating range for the motion detecting device 10 and outward define a fourth search radius r4 on the boundary of the search frame S5B. Moreover, scanning range of the fourth search radius r4 is a reserved region for motion detecting device 10 searching and calculating the reference image R5B, so as to dynamically adjust the image sensing region for acquiring higher speed/acceleration, wherein the search frame S5B has 8×8 pixel (i.e. active sensing region) and the fourth search radius r4 has 3 pixel distance (i.e. reserved sensing region). It is worth mentioned that the reference image R5B in FIG. 5B is 11×11 pixel, which is smaller than original light image (16×16 pixel). In other words, as long as the motion detecting device 10 searches and calculates the reference image R5B formed by the active sensing region and the reserved sensing region of the original light image. In the present embodiment, the fourth search radius r4 is equal to the first search radius r1, and the third search radius r3 is larger than the fourth search radius r4. Furthermore, compared to embodiment in FIG. 3B, the motion detecting device 10 in the embodiment of FIG. 5B defines the fourth search radius r4 to decrease the image sensing region for reducing power consumption; which means, as long as the motion detecting device 10 searches and calculates the reference image R5B formed by the active sensing region and the reserved sensing region of the original light image. In other words, compared to embodiment in FIG. 5B, the reference image R3B in the embodiment of FIG. 3B is 13×13 pixel, the motion detecting device 10 defines the third search radius r3 to increase the image sensing region for acquiring higher speed/acceleration.

Accordingly, the fourth search radius r4 (three pixel distance) is larger than the second search radius r2 (one pixel distance) of the smooth surface; which means that the reserved sensing region for searching and calculating on the rough surface is larger than the reserved sensing region on the smooth surface. Therefore, the motion detecting device 10 may properly set search radius for dynamically adjust the image sensing region so as to reduce power consumption.

[One Embodiment of the Motion Detecting Device for Light Field Apparatus]

Figure 6A:
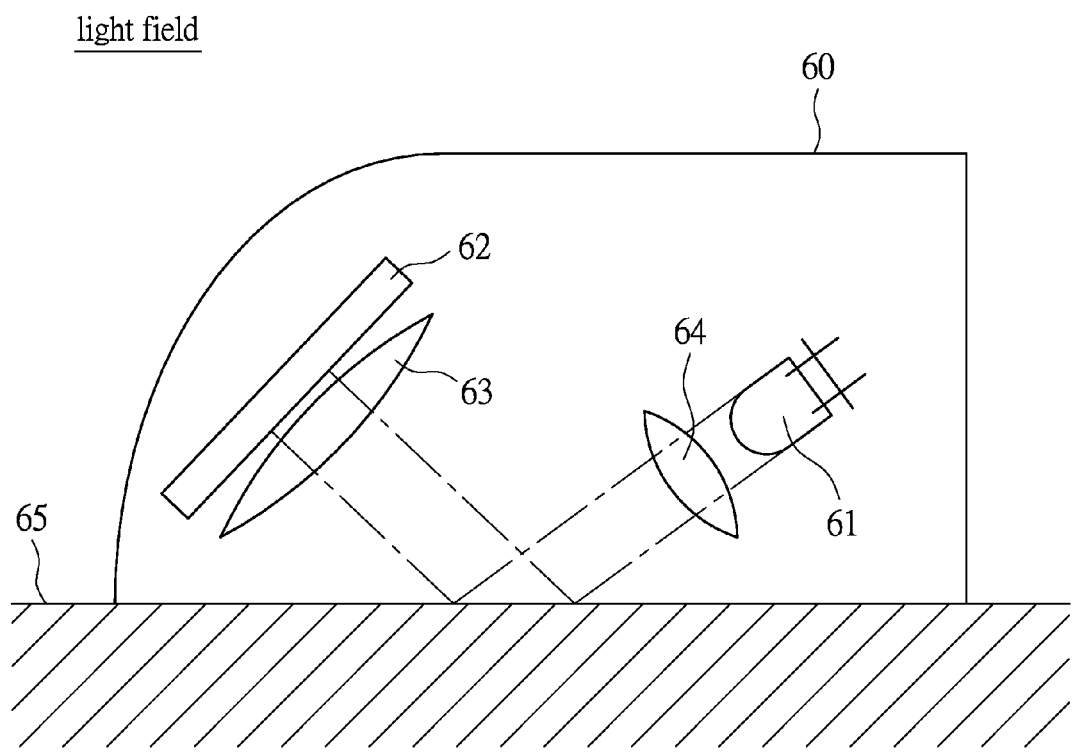
FIG. 6A shows schematic diagram of the motion detecting device for light field according to one embodiment of the instant disclosure.
Figure 6B:
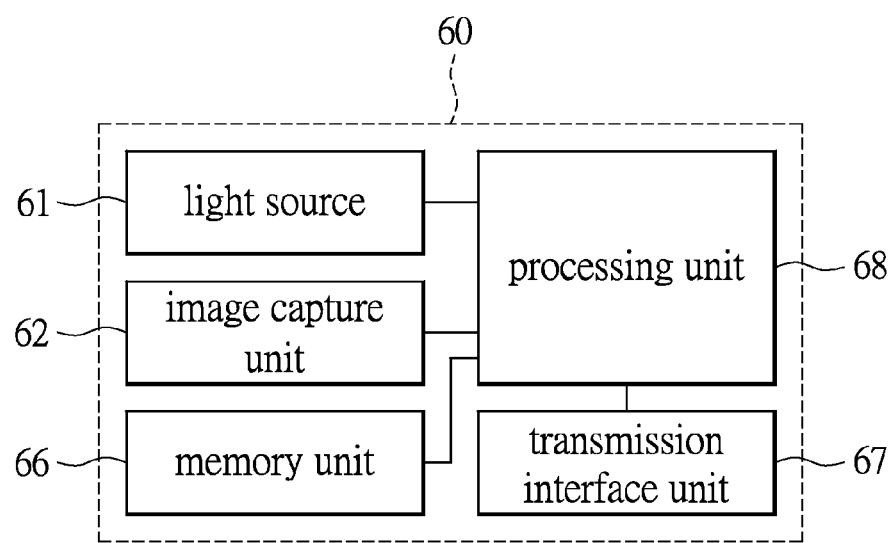
FIG. 6B shows circuit block diagram of the motion detecting device corresponding to FIG. 6A.

Referring to FIGS. 6A and 6B concurrently, FIG. 6A shows schematic diagram of the motion detecting device for light field according to one embodiment of the instant disclosure. FIG. 6B shows circuit block diagram of the motion detecting device corresponding to FIG. 6A. Similarly, in the present embodiment, the motion detecting device 10 is configured for detecting flatness of a surface 15, and dynamically adjusting an image sensing region according to flatness of a surface 15, wherein the motion detecting device 10 may be an optical mouse or optical navigation device. As shown in FIGS. 6A and 6B, the motion detecting device 60 includes a light source 61, an image capture unit 62, a processing unit 68, a memory unit 66, a transmission interface unit 67, a first lens 64 and a second lens 63. The light source 61, the image capture unit 62, the memory unit 66 and the transmission interface unit 67 are electrically connected to the processing unit 68 respectively. The first lens is disposed in the front of the light source 61, the second lens 63 is disposed in the front of the image capture unit 62, and the image capture unit 62 is disposed at a reflection path of the light launched from the light source 61.

Similarly, in the present embodiment, the light source 61 configured for launching a light with an emission cycle may be a light-emitting diode (LED) or a laser diode. The image capture unit 62 is configured for capturing at least one reference image of the surface 65 according to a fixed sampling period, and the emission period of the light source 61 is integer multiple of the fixed sampling period, and then the image capture unit 62 can be synchronized to emission of the light source 61, so as to make the image capture unit 62 capture the reference image of the surface 65. The processing unit 68 is configured for calculating an exposure reference value of the light source 61 (e.g. exposure time or amount of the exposure of the light source 61) and an image characteristic value of the reference image, and then accordingly determining whether the surface 65 is in a first rough coefficient range or a second rough coefficient range, wherein the processing unit 68 chooses a search frame which is smaller than the reference image on the reference image. The function of the memory unit 66, the transmission interface unit 67, the first lens 64 and the second lens 63 is identical to that of the memory unit 16, the transmission interface unit 17, the first lens 14 and the second lens 13 in the embodiment of FIG. 1B, so it is not repeated thereto. In the present embodiment, each frame or light image has 16×16 pixel and the search frame is set to 8×8 pixel, the first search radius and the fourth search radius are set to three pixel distance, the third search radius is set to five pixel distance and the second search radius is set to one pixel distance. All the values set herein are merely one embodiment of the instant disclosure, it is not restricted thereto and these values can be determined based on the actual product design.

The following description is further instruction in teaching a work mechanism of the motion detecting device 60.

Figure 7:
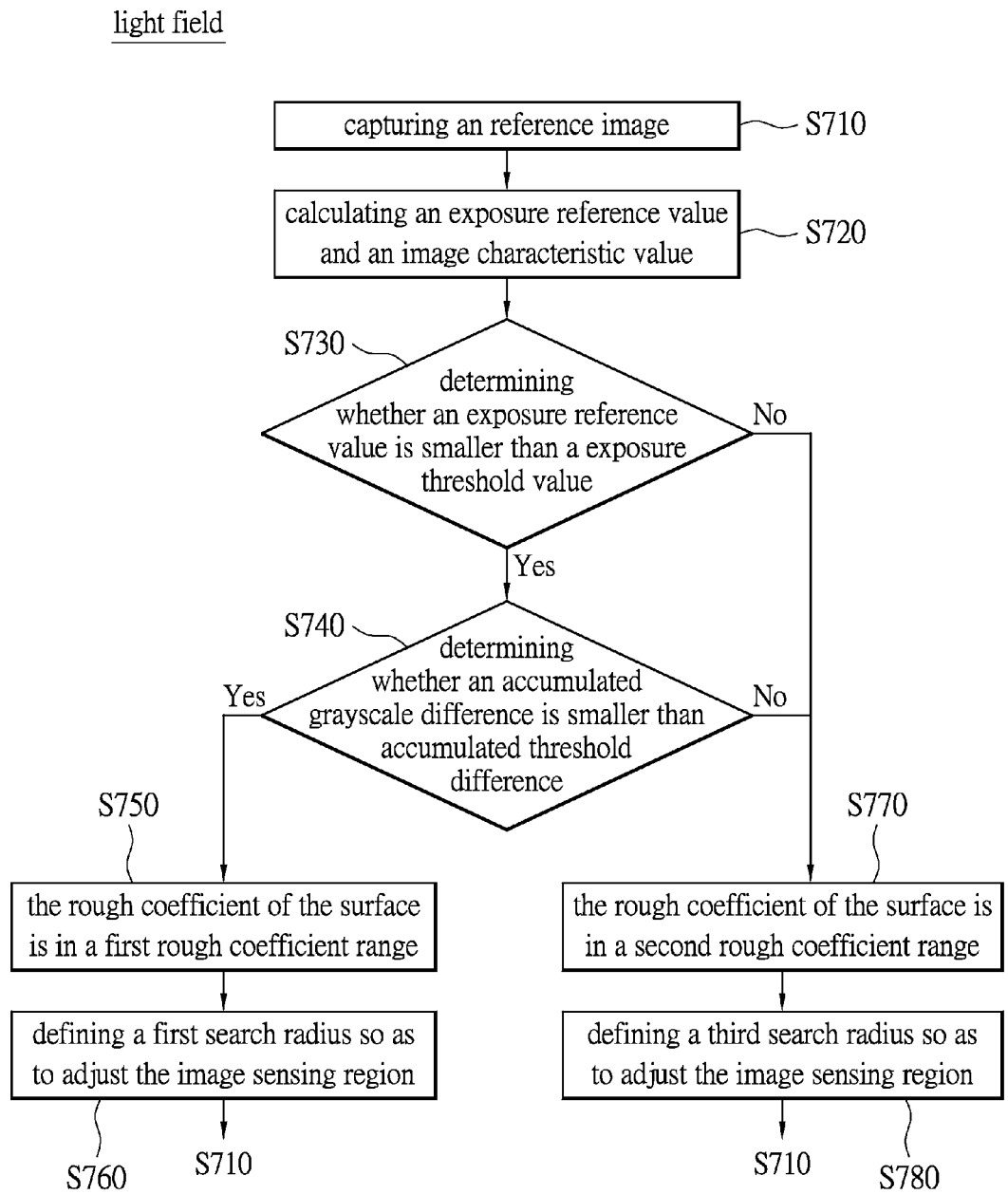
FIG. 7 shows flow diagram of dynamically adjusting the image sensing region in the light field according to one embodiment of the instant disclosure.
Figure 8A:
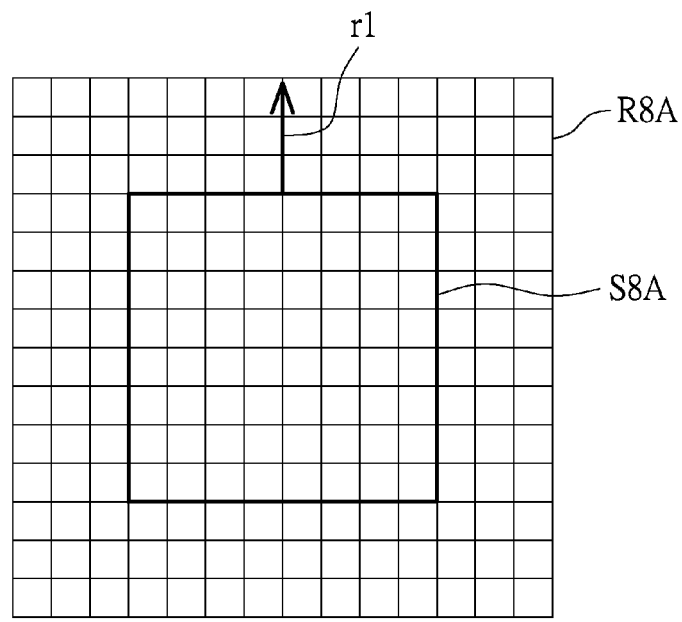
FIGS. 8A and 8B shows schematic diagram of the reference image and the search frame corresponding to FIG. 7.
Figure 8B:
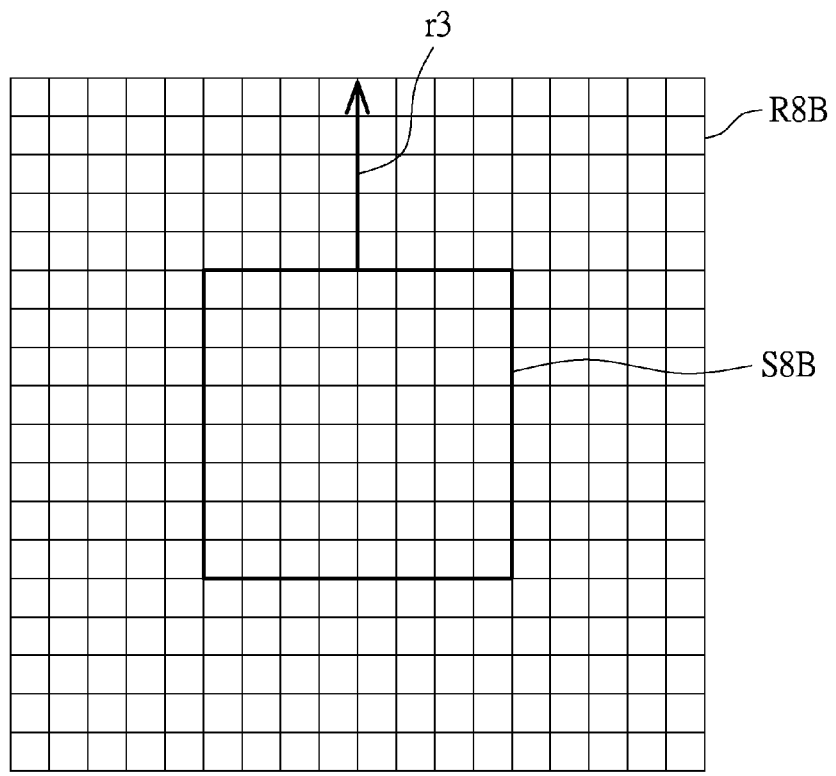

Referring to FIGS. 6A~8B concurrently, FIG. 7 shows flow diagram of dynamically adjusting the image sensing region in the light field according to one embodiment of the instant disclosure. FIGS. 8A and 8B shows schematic diagram of the reference image and the search frame corresponding to FIG. 7. It is to be noted that, in the embodiment of FIG. 7, it discloses an exemplary embodiment for detecting flatness of the surface in the light field apparatus so as to dynamically adjust the image sensing region to acquire higher speed/acceleration. The method for dynamically adjusting an image sensing region includes steps as follows: capturing an reference image (step S710); calculating an exposure reference value and an image characteristic value (step S720); determining whether an exposure reference value is smaller than a exposure threshold value (step S730); determining whether an accumulated grayscale difference is smaller than accumulated threshold difference (step S740); determining that the rough coefficient of the surface is in a first rough coefficient range (step S750); defining a first search radius so as to adjust the image sensing region (step S760); determining that the rough coefficient of the surface is in a second rough coefficient range (step S770); defining a third search radius so as to adjust the image sensing region (step S780). The following is to sequentially instruct each step for understanding the instant disclosure.

In step S710, when the light source 61 emits a light with an emission cycle to the surface 65, the image capture unit 62 captures an reference image or the optical image of surface 65 with a sampling period synchronized to the emission cycle of the light source 65 and then transmits the reference image to the processing unit 68, and then enters into step S720.

In step S720, the processing unit 68 calculates an exposure time or an amount of exposure of the light source 61 for acquiring an exposure reference value (or determined by amount of current flowing through the LED) at the time of capturing the reference image by the image capture unit 62, and then the processing unit 68 calculates the accumulated grayscale difference according to the reference image received; which means, grayscale value of each adjacent pixel proceed subtraction so as to acquire a difference value, and then accumulates each difference value to acquire the accumulated grayscale difference in this way. Furthermore, the accumulated grayscale difference is proportional to the image characteristic value, so the image characteristic value of the reference image can be acquired from the accumulated grayscale difference. Next, the flow enters into step S730.

In step S730, the processing unit 68 further determines whether the exposure reference value is smaller than the exposure threshold value stored in the memory unit 66, wherein if the exposure reference value is larger than the exposure threshold value, the exposure reference value is a long exposure reference value; if the exposure reference value is smaller than the exposure threshold value, the exposure reference value is a short exposure reference value. When the processing unit 68 determines the exposure reference value of the light source 61 is smaller than the exposure threshold value, it enters into step S740 to continue determining whether the accumulated grayscale difference is smaller than the accumulated threshold difference. When the processing unit 68 determines the exposure reference value of the light source 61 is larger than the exposure threshold value, it enters into step S770.

In step S740, when the processing unit 68 determines the exposure reference value of the light source 61 is smaller than the exposure threshold value, it enters into step S740 to continue determining whether the accumulated grayscale difference of the reference image is smaller than the accumulated threshold difference stored in the memory unit 66. If the accumulated grayscale difference is larger than the accumulated threshold difference, the reference image captured by the image capture unit 62 is with high image characteristic value; if the accumulated grayscale difference is smaller than the accumulated threshold difference, the reference image captured by the image capture unit 62 is with low image characteristic value. When the processing unit 68 determines that the accumulated grayscale difference of the reference image is smaller than the accumulated threshold difference, it enters into step S750. When the processing unit 68 determines that the accumulated grayscale difference of the reference image is larger than the accumulated threshold difference, it enters into step S770.

In step S750, it means that the reference image satisfies two conditions; which means, one condition is the exposure reference value of the light source 61 is smaller than the exposure threshold value, and the other condition is that the accumulated grayscale difference of the reference image is smaller than accumulated threshold difference. Accordingly, the processing unit 68 determines the rough coefficient of the surface 65 is in the first rough coefficient range according to determination result, wherein the surface 65 in the first rough coefficient range is smooth surface. Next, it enters into step S760.

In step S760, the motion detecting device 60 starts to dynamically adjust the image sensing region according to flatness of the surface 65. Referring to FIG. 8A concurrently, when the processing unit 68 in the motion detecting device 60 determines the surface 65 is located at the smooth surface in the first rough coefficient range according to determination result, the processing unit 68 chooses or sets a search frame S8A on the reference image R8A so as to define searching and calculating range for the motion detecting device 60 and outward define a first search radius r1 on the boundary of the search frame S8A. Moreover, scanning range of the first search radius r1 is a reserved region for motion detecting device 60 searching and calculating the reference image R8A, so as to dynamically adjust the image sensing region for acquiring higher speed/acceleration, wherein the search frame S8A has 8×8 pixel (i.e. active sensing region) and the first search radius r1 has 3 pixel distance (i.e. reserved sensing region). It is worth mentioned that the reference image R8A in FIG. 8A is 11×11 pixel, which is smaller than original light image (16×16 pixel). In other words, as long as the motion detecting device 60 searches and calculates the reference image R8A formed by the active sensing region and the reserved sensing region of the original light image. Next, the motion detecting device 60 will back to step S710 to continue detecting flatness of the surface for determining whether to dynamically adjust the image sensing region again.

In step S770, it means that the reference image satisfies the following condition; which means, the condition is the exposure reference value of the light source 61 is larger than the exposure threshold value, or the exposure reference value of the light source 61 is smaller than the exposure threshold value and the accumulated grayscale difference of the reference image is larger than accumulated threshold difference. Accordingly, the processing unit 68 determines the rough coefficient of the surface 65 is in the second rough coefficient range according to determination result, wherein the surface 65 in the second rough coefficient range is the rough surface. Next, it enters into step S780.

In step S780, the motion detecting device 60 starts to dynamically adjust the image sensing region according to flatness of the surface 65. Referring to FIG. 8B concurrently, when the processing unit 68 in the motion detecting device 60 determines the surface 65 is located at the rough surface in the second rough coefficient range according to determination result, the processing unit 68 chooses or sets a search frame S8B on the reference image R8B so as to define searching and calculating range for the motion detecting device 60 and outward define a third search radius r3 on the boundary of the search frame S8B. Moreover, scanning range of the third search radius r3 is a reserved region for motion detecting device 60 searching and calculating the reference image R8B, so as to dynamically adjust the image sensing region for acquiring higher speed/acceleration, wherein the search frame S8B has 8×8 pixel (i.e. active sensing region) and the third search radius r3 has 5 pixel distance (i.e. reserved sensing region). It is worth mentioned that the reference image R8B in FIG. 8B is 13×13 pixel, which is smaller than original light image (16×16 pixel). In other words, as long as the motion detecting device 60 searches and calculates the reference image R8B formed by the active sensing region and the reserved sensing region of the original light image. Next, the motion detecting device 60 will back to step S710 to continue detecting flatness of the surface for determining whether to dynamically adjust the image sensing region again.

Accordingly, under operation of light field apparatus, the third search radius r3 (five pixel distance) in the rough surface is larger than the first search radius r1 (three pixel distance) in the smooth surface; which means that the reserved sensing region for searching and calculating on the rough surface is larger than the reserved sensing region on the smooth surface. Therefore, the motion detecting device 60 may properly set search radius for dynamically adjust the image sensing region so as to acquire appropriate speed/acceleration.

[Another Embodiment of the Motion Detecting Device for Light Field Apparatus]

Figure 9:
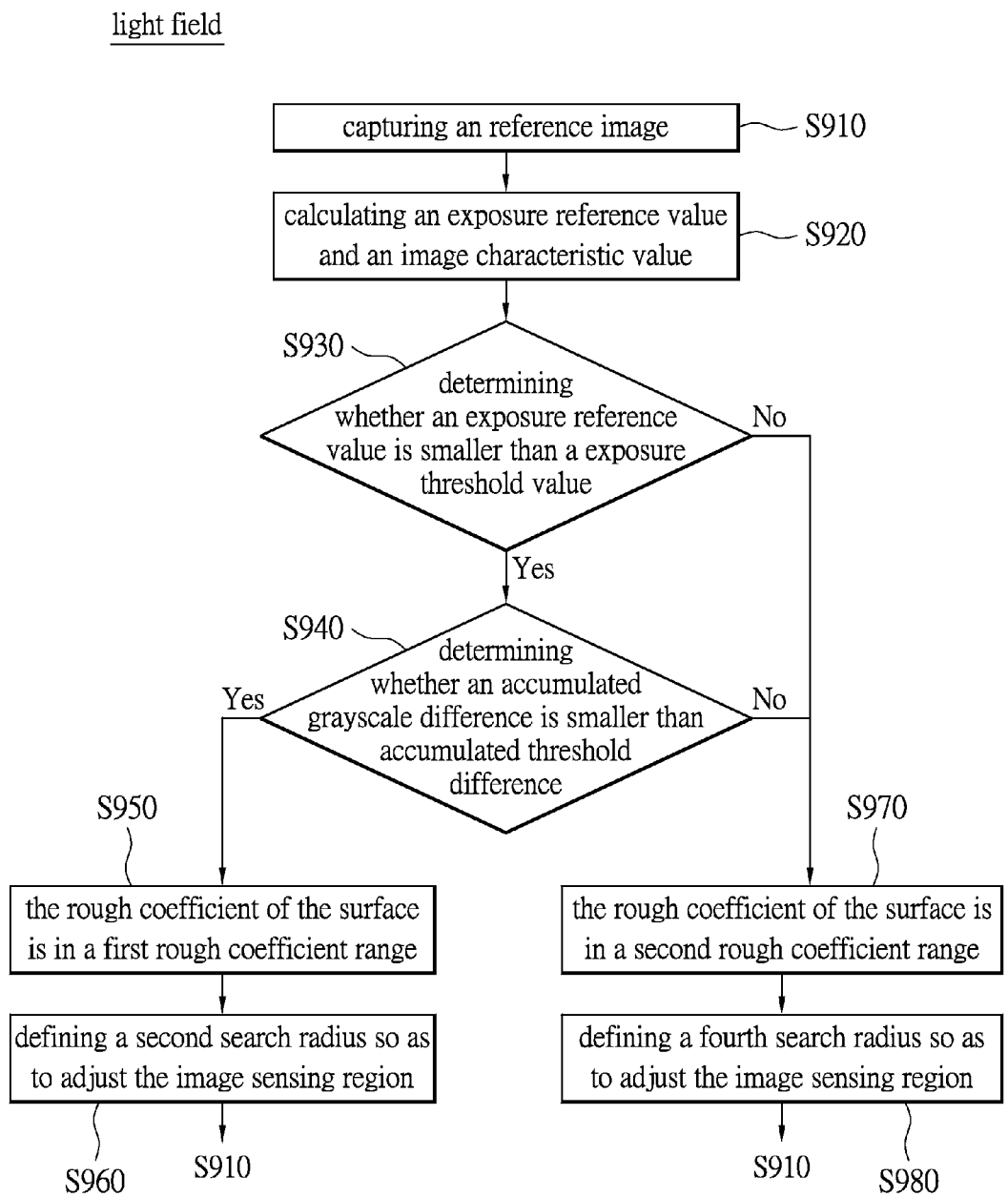
FIG. 9 shows flow diagram of dynamically adjusting the image sensing region in the light field according to another one embodiment of the instant disclosure.
Figure 10A:
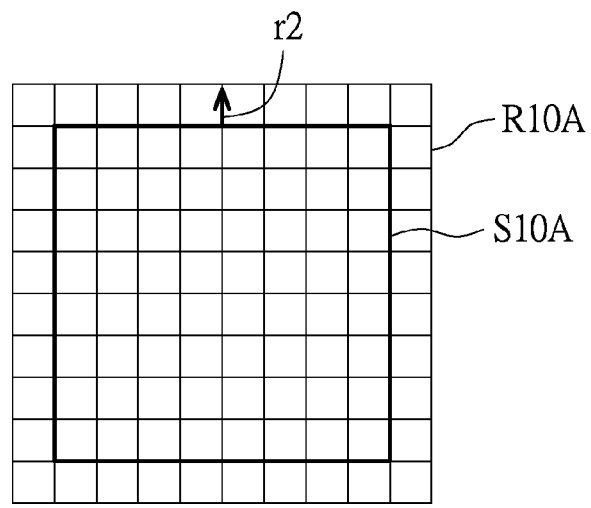
FIGS. 10A and 10B shows schematic diagram of the reference image and the search frame corresponding to FIG. 9.
Figure 10B:
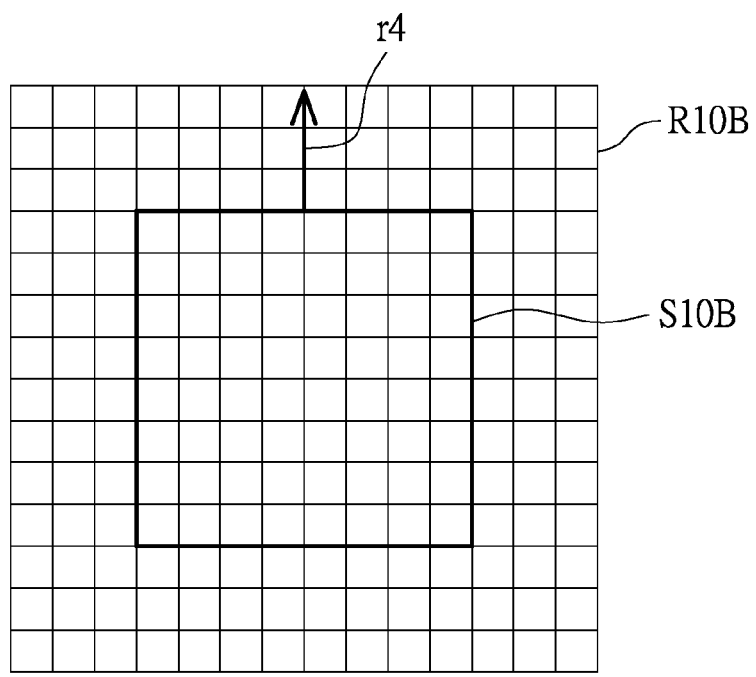

Referring to FIGS. 6A, 6B and 9~10B, FIG. 7 shows flow diagram of dynamically adjusting the image sensing region in the light field according to another one embodiment of the instant disclosure. FIG. 9 shows flow diagram of dynamically adjusting the image sensing region in the light field according to another one embodiment of the instant disclosure. FIGS. 10A and 10B shows schematic diagram of the reference image and the search frame corresponding to FIG. 9. It is to be noted that, in the embodiment of FIG. 9, it discloses an exemplary embodiment for detecting flatness of the surface in the light field apparatus so as to dynamically adjust the image sensing region to reduce power consumption. Herein, to reduce power consumption is compared to the embodiment of FIGS. 7~8B. The method for dynamically adjusting an image sensing region includes steps as follows: capturing an reference image (step S910); calculating an exposure reference value and an image characteristic value (step S920); determining whether an exposure reference value is smaller than a exposure threshold value (step S930); determining whether an accumulated grayscale difference is smaller than accumulated threshold difference (step S940); determining that the rough coefficient of the surface is in a first rough coefficient range (step S950); defining a second search radius so as to adjust the image sensing region (step S960); determining that the rough coefficient of the surface is in a second rough coefficient range (step S970); defining a fourth search radius so as to adjust the image sensing region (step S980). The following is to sequentially instruct each step for understanding the instant disclosure.

In step S910, when the light source 61 emits a light with an emission cycle to the surface 65, the image capture unit 62 captures an reference image or the optical image of surface 65 with a sampling period synchronized to the emission cycle of the light source 65 and then transmits the reference image to the processing unit 68, and then enters into step S920.

In step S920 (similar to step S720), the processing unit 68 calculates an exposure time or an amount of exposure of the light source 61 for acquiring an exposure reference value (or determined by amount of current flowing through the LED) at the time of capturing the reference image by the image capture unit 62, and then the processing unit 68 calculates the accumulated grayscale difference according to the reference image received; which means, grayscale value of each adjacent pixel proceed subtraction so as to acquire a difference value, and then accumulates each difference value to acquire the accumulated grayscale difference in this way. Furthermore, the accumulated grayscale difference is proportional to the image characteristic value, so the image characteristic value of the reference image can be acquired from the accumulated grayscale difference. Next, it enters into step S930.

In step S930, similarly, the processing unit 68 further determines whether the exposure reference value is smaller than the exposure threshold value stored in the memory unit 66, wherein if the exposure reference value is larger than the exposure threshold value, the exposure reference value is a long exposure reference value; if the exposure reference value is smaller than the exposure threshold value, the exposure reference value is a short exposure reference value. When the processing unit 68 determines the exposure reference value of the light source 61 is smaller than the exposure threshold value, it enters into step S940 to continue determining whether the accumulated grayscale difference is smaller than the accumulated threshold difference. When the processing unit 68 determines the exposure reference value of the light source 61 is larger than the exposure threshold value, it enters into step S970.

In step S940, when the processing unit 68 determines the exposure reference value of the light source 61 is smaller than the exposure threshold value, it enters into step S940 to continue determining whether the accumulated grayscale difference of the reference image is smaller than the accumulated threshold difference stored in the memory unit 66. If the accumulated grayscale difference is larger than the accumulated threshold difference, the reference image captured by the image capture unit 62 is with high image characteristic value; if the accumulated grayscale difference is smaller than the accumulated threshold difference, the reference image captured by the image capture unit 62 is with low image characteristic value. When the processing unit 68 determines that the accumulated grayscale difference of the reference image is smaller than the accumulated threshold difference, it enters into step S950. When the processing unit 68 determines that the accumulated grayscale difference of the reference image is larger than the accumulated threshold difference, it enters into step S970.

In step S950, it means that the reference image satisfies two conditions; which means, one condition is the exposure reference value of the light source 61 is smaller than the exposure threshold value, and the other condition is that the accumulated grayscale difference of the reference image is smaller than accumulated threshold difference. Accordingly, the processing unit 68 determines the rough coefficient of the surface 65 is in the first rough coefficient range according to determination result, wherein the surface 65 in the first rough coefficient range is smooth surface. Next, it enters into step S960.

In step S960, the motion detecting device 60 starts to dynamically adjust the image sensing region according to flatness of the surface 65. Referring to FIG. 10A concurrently, when the processing unit 68 in the motion detecting device 60 determines the surface 65 is located at the smooth surface in the first rough coefficient range according to determination result, the processing unit 68 chooses or sets a search frame S10A on the reference image R10A so as to define searching and calculating range for the motion detecting device 60 and outward define a second search radius r2 on the boundary of the search frame S10A. Moreover, scanning range of the second search radius r2 is a reserved region for motion detecting device 60 searching and calculating the reference image R10A, so as to dynamically adjust the image sensing region for acquiring higher speed/acceleration, wherein the search frame S10A has 8×8 pixel (i.e. active sensing region) and the second search radius r2 has 1 pixel distance (i.e. reserved sensing region). It is worth mentioned that the reference image R10A in FIG. 10A is 11×11 pixel, which is smaller than original light image (16×16 pixel). In other words, as long as the motion detecting device 60 searches and calculates the reference image R10A formed by the active sensing region and the reserved sensing region of the original light image. Next, the motion detecting device 60 will back to step S910 to continue detecting flatness of the surface for determining whether to dynamically adjust the image sensing region again. Furthermore, compared to embodiment of FIG. 8, the motion detecting device 60 in the embodiment of FIG. 10A defines the second search radius r2 to decrease the image sensing region for reducing power consumption. In other words, compared to embodiment of FIG. 10A, the reference image in the embodiment of FIG. 8A is 11×11 pixel, and the motion detecting device 60 defines the first search radius r1 to increase the image sensing region for acquiring higher speed/ acceleration.

In step S970, it means that the reference image satisfies the following condition; which means, the condition is the exposure reference value of the light source 61 is larger than the exposure threshold value, or the exposure reference value of the light source 61 is smaller than the exposure threshold value and the accumulated grayscale difference of the reference image is larger than accumulated threshold difference. Accordingly, the processing unit 68 determines the rough coefficient of the surface 65 is in the second rough coefficient range according to determination result, wherein the surface 65 in the second rough coefficient range is the rough surface. Next, it enters into step S980.

In step S980, the motion detecting device 60 starts to dynamically adjust the image sensing region according to flatness of the surface 65. Referring to FIG. 10B concurrently, when the processing unit 68 in the motion detecting device 60 determines the surface 65 is located at the rough surface in the second rough coefficient range according to determination result, the processing unit 68 chooses or sets a search frame S10B on the reference image R10B so as to define searching and calculating range for the motion detecting device 60 and outward define a fourth search radius r4 on the boundary of the search frame S10B. Moreover, scanning range of the fourth search radius r4 is a reserved region for motion detecting device 60 searching and calculating the reference image R10B, so as to dynamically adjust the image sensing region for acquiring higher speed/acceleration, wherein the search frame S10B has 8×8 pixel (i.e. active sensing region) and the fourth search radius r4 has 3 pixel distance (i.e. reserved sensing region). It is worth mentioned that the reference image R10B in FIG. 10B is 13×13 pixel, which is smaller than original light image (16×16 pixel). Next, the motion detecting device 60 will back to step S910 to continue detecting flatness of the surface for determining whether to dynamically adjust the image sensing region again. In the present embodiment, the fourth search radius r4 is equal to the first search radius r1, and the third search radius r3 is larger than the fourth search radius r4. Furthermore, compared to the embodiment in FIG. 8B, the motion detecting device 60 in the embodiment of FIG. 10B defines the fourth search radius r4 to decrease the image sensing region for reducing power consumption; which means, as long as the motion detecting device 60 searches and calculates the reference image R10B formed by the active sensing region and the reserved sensing region of the original light image. In other words, compared to the embodiment in FIG. 10B, the reference image R8B in the embodiment of FIG. 8B is 13×13 pixel, and the motion detecting device 60 defines the third search radius r3 to increase image sensing region for acquiring higher speed/acceleration.

To sum up, the motion detecting device and the method for dynamically adjusting the image sensing region provided by the instant disclosure is able to set different search radius according to flatness of the surface to form reserved sensing region for dynamically adjusting the image sensing region so as to achieve adjustment of tracking speed.

At least one embodiment of the embodiments in the instant disclosure, the motion detecting device is able to set different search radius according to flatness of the surface to form reserved sensing region for dynamically adjust the image sensing region so as to reduce power consumption of the motion detecting device.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A motion detecting device, configured for detecting a flatness of a surface and dynamically adjusting an image sensing region, the motion detecting device comprising:
   a light source, launching a light;
   an image capture unit, capturing at least one reference image of the surface according to a fixed sampling period; and
   a processing unit, connected to the light source and the image capture unit, the processing unit calculating an exposure reference value of the light source and an image characteristic value of the reference image, and then accordingly determining whether the surface is in a first rough coefficient range, which is a range for a smooth surface, or a second rough coefficient range, which is a range for a rough surface, wherein the processing unit chooses a search frame which is smaller than the reference image on the reference image,
   wherein if the surface is in the first rough coefficient range, the processing unit defines a first image sensing region on the reference image, the first image sensing region is larger than the search frame by a first search radius in order to achieve a high operation speed of the motion detecting device or defines a second image sensing region on the reference image, the second image sensing region is larger than the search frame by a second search radius in order to reduce power consumption, wherein the first image sensing region is larger than the second image sensing region and the first search radius is larger than the second search radius;
   wherein if the surface is in the second rough coefficient range, the processing unit defines a third image sensing region on the reference image, the third image sensing region is larger than the search frame by a third search radius in order to achieve a high operation speed of the motion detecting device or defines a fourth image sensing region on the reference image, the fourth image sensing region is larger than the search frame by a fourth search radius in order to reduce power consumption, wherein the third image sensing region is larger than the fourth image sensing region, and the third search radius is larger than the first search radius and the fourth search radius; and wherein the search frame is moved on the first image sensing region, the second image sensing region, the third image sensing region, or the fourth image sensing region pixel by pixel for calculating displacement of pixels of the image sensing regions.

2. The motion detecting device according to claim 1, further comprising:

a memory unit, connected to the processing unit, the memory unit configured for storing at least one threshold value;

a transmission interface unit, connected to the processing unit, the transmission interface unit configured for transmitting a motion information to an image display device so as to control correspondingly;

a first lens, disposed in the front of the light source, the first lens configured for adjusting an illumination range of the light source; and a second lens, disposed in the front of the image capture unit, the second lens configured for enhancing the efficiency of light-sensitive of the image capture unit, wherein the light source is a light-emitting diode or a laser diode.

3. The motion detecting device according to claim 1, wherein the exposure reference value is an exposure time or an amount of the exposure, wherein the image capture unit adjusts the amount of the exposure of the light source via an aperture.

4. The motion detecting device according to claim 1, wherein the processing unit calculates the image characteristic value via an accumulated grayscale difference of the reference image and if the accumulated grayscale difference is larger than an accumulated threshold value, the reference image has a high image characteristic value; if the accumulated grayscale difference is smaller than the accumulated threshold value, the reference image has a low image characteristic value, wherein the accumulated grayscale difference is proportional to the image characteristic value.

5. The motion detecting device according to claim 1, wherein if the exposure reference value of the light source is larger than an exposure threshold value, the exposure reference value is a long exposure reference value; if the exposure reference value of the light source is smaller than an exposure threshold value, the exposure reference value is a short exposure reference value.

6. The motion detecting device according to claim 1, wherein when the image capture unit is located in a dark field, the processing unit determines the surface is in the first rough coefficient range or the second rough coefficient range via respectively judging the exposure value and the image characteristic value.

7. The motion detecting device according to claim 6, wherein the dark field defines that the image capture unit is located at a scattering path of the light source.

8. The motion detecting device according to claim 1, wherein when the image capture unit is located in a dark field, the processing unit makes the exposure reference value divided by the image characteristic value so as to acquire an operation value; if the operation value is larger than a predetermined threshold value, the surface is in the first rough coefficient range; if the operation value is smaller than the predetermined threshold value, the surface is in the second rough coefficient range.

9. The motion detecting device according to claim 8, wherein the dark field defines that the image capture unit is located at a scattering path of the light source.

10. The motion detecting device according to claim 1, wherein when the image capture unit is located in a light field, the processing unit determines the surface is in the first rough coefficient range or the second rough coefficient range via respectively judging the exposure value and the image characteristic value.

11. The motion detecting device according to claim 10, wherein the light field defines that the image capture unit is located at a reflection path of the light source.

12. The motion detecting device according to claim 1, wherein the surface in the first rough coefficient range is a smooth surface, and the surface in the second rough coefficient range is a rough surface.

13. A method for dynamically adjusting an image sensing region, used for a motion detecting device, comprising:

capturing at least one reference image of a surface according to a fixed sampling period;

calculating an exposure reference value of a light source and an image characteristic value of the reference image;

determining whether the surface is in a first rough coefficient range, which is a range for a smooth surface, or a second rough coefficient range, which is a range for a rough surface, according to at least one threshold value; and adjusting the image sensing region dynamically according to a determination result of whether the surface being in the first rough coefficient range or a second rough coefficient range, wherein the adjusting step further comprises:

if the surface is in the first rough coefficient range, the processing unit defines a first image sensing region on the reference image, the first image sensing region is lamer than the search frame by a first search radius in order to achieve a high operation speed of the motion detecting device or defines a second image sensing region on the reference image, the second image sensing region is lamer than the search frame by a second search radius in order to reduce power consumption, wherein the first image sensing region is lamer than second image sensing region and the first search radius is lamer than the second search radius;

if the surface is in the second rough coefficient range, the processing unit defines a third image sensing region on the reference image, the third image sensing region is lamer than the search frame by a third search radius in order to achieve a high operation speed of the motion detecting device or defines a fourth image sensing region on the reference image, the fourth image sensing region is lamer than the search frame by a fourth search radius in order to reduce power consumption, wherein the third image sensing region is lamer than the fourth image sensing region and the third search radius is lamer than the first search radius and the fourth search radius; and wherein the search frame is moved on the first image sensing region, the second image sensing region, the third image sensing region, or the fourth image sensing region pixel by pixel for calculating displacement of pixels of the image sensing regions.

14. The method for dynamically adjusting the image sensing region according to claim 13, wherein the exposure reference value is an exposure time or an amount of the exposure, wherein the image capture unit adjusts the amount of the exposure of the light source via an aperture.

15. The method for dynamically adjusting the image sensing region according to claim 13, further comprising:
calculating the image characteristic value via an accumulated grayscale difference of the reference image;
if the accumulated grayscale difference is larger than an accumulated threshold value, the reference image has a high image characteristic value; and
if the accumulated grayscale difference is smaller than the accumulated threshold value, the reference image has a low image characteristic value,
wherein the accumulated grayscale difference is proportional to the image characteristic value.

16. The method for dynamically adjusting the image sensing region according to claim 13, wherein if the exposure reference value of the light source is larger than an exposure threshold value, the exposure reference value is a long exposure reference value; if the exposure reference value of the light source is smaller than an exposure threshold value, the exposure reference value is a short exposure reference value.

17. The method for dynamically adjusting the image sensing region according to claim 13, the processing unit makes the exposure reference value divided by the image characteristic value so as to acquire an operation value; if the operation value is larger than a predetermined threshold value, the surface is in the first rough coefficient range; if the operation value is smaller than the predetermined threshold value, the surface is in the second rough coefficient range.

18. The method for dynamically adjusting the image sensing region according to claim 13, further comprising:
determining the surface being in the first rough coefficient range or the second rough coefficient range via respectively judging the exposure value and the image characteristic value.

19. The method for dynamically adjusting the image sensing region according to claim 13, wherein the surface in the first rough coefficient range is a smooth surface, and the surface in the second rough coefficient range is a rough surface.

* * * * *